US 6,688,829 B1

(12) United States Patent
Popovich et al.

(10) Patent No.: US 6,688,829 B1
(45) Date of Patent: Feb. 10, 2004

(54) CEILING CLIP

(75) Inventors: Michael S. Popovich, Bartlett, IL (US); Anthony R. Caringella, Norridge, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 10/310,089

(22) Filed: Dec. 4, 2002

(51) Int. Cl.⁷ ............................ F16B 15/00; F16B 15/02
(52) U.S. Cl. ..................... 411/441; 411/61; 411/480; 411/999
(58) Field of Search .................. 411/60.1, 61, 440, 411/441, 448, 449, 480, 999

(56) References Cited

U.S. PATENT DOCUMENTS

| | | | |
|---|---|---|---|
| 3,133,378 A | * | 5/1964 | Poupitch ............... 411/449 X |
| 3,452,637 A | | 7/1969 | O'Brien |
| 3,491,972 A | | 1/1970 | Townshend |
| 3,638,892 A | | 2/1972 | Boye et al. |
| 3,870,428 A | | 3/1975 | Jackson |
| 3,921,495 A | | 11/1975 | Braun et al. |
| 4,286,496 A | | 9/1981 | Harris |
| 4,703,883 A | | 11/1987 | Losada |
| 4,736,923 A | | 4/1988 | Losada |
| 4,802,802 A | * | 2/1989 | Thurner ............... 411/441 X |
| 4,915,561 A | | 4/1990 | Buhri et al. |
| 5,110,247 A | | 5/1992 | Losada |
| 5,178,503 A | | 1/1993 | Losada |
| 5,261,770 A | | 11/1993 | Hoepker et al. |
| 5,417,534 A | | 5/1995 | Losada |
| 5,525,018 A | | 6/1996 | Losada |
| 5,569,010 A | | 10/1996 | Janssen et al. |
| 5,620,288 A | | 4/1997 | Janssen et al. |
| 5,624,220 A | | 4/1997 | Janssen et al. |
| 5,634,756 A | | 6/1997 | Losada |
| 5,664,922 A | | 9/1997 | Janssen et al. |
| 5,704,752 A | * | 1/1998 | Logerot ............... 411/61 X |
| 5,788,444 A | | 8/1998 | Losada |
| 5,897,082 A | | 4/1999 | Losada |

FOREIGN PATENT DOCUMENTS

WO     WO 91/00792     1/1991

* cited by examiner

Primary Examiner—Neill Wilson
(74) Attorney, Agent, or Firm—Lisa M. Soltis; Mark W. Croll; Donald J. Breh

(57) ABSTRACT

A fastener subassembly for being driven by a power actuated tool comprises a flute having a body and a pin having a tip for being driven into a substrate. The body of the flute has a longitudinal axis, a muzzle loading end, a mounting end, and a hollow bore. The pin is mounted in the bore with its tip proximate the mounting end, such that the tip is protected from pressure between the fastener subassembly and the substrate prior to driving. The mounting end of the flute has wings that extend radially outwardly. The wings allow the subassembly to be mounted in a hole in any suitable member that needs to be attached to a substrate while holding the pin substantially perpendicular to the substrate during driving.

21 Claims, 3 Drawing Sheets

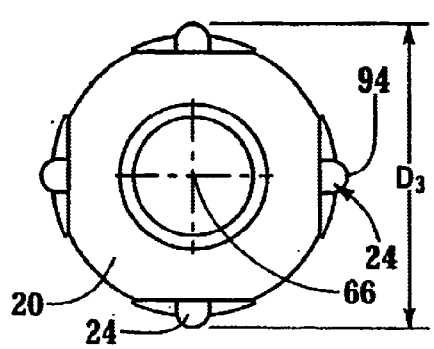
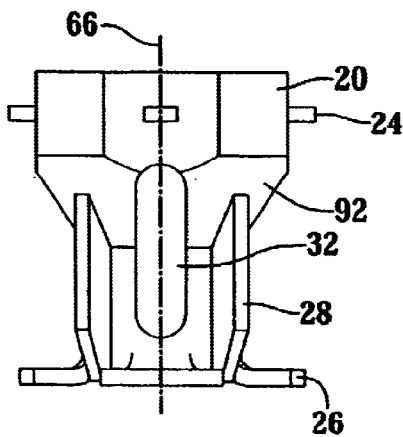
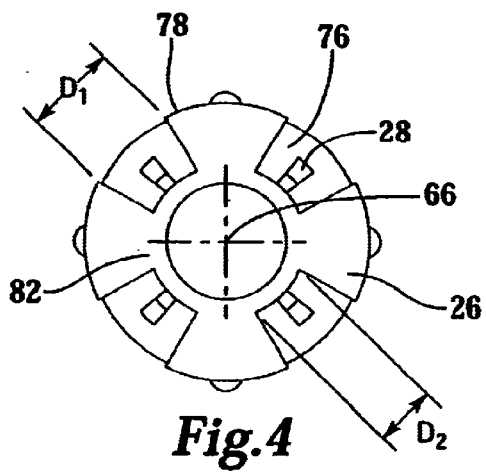
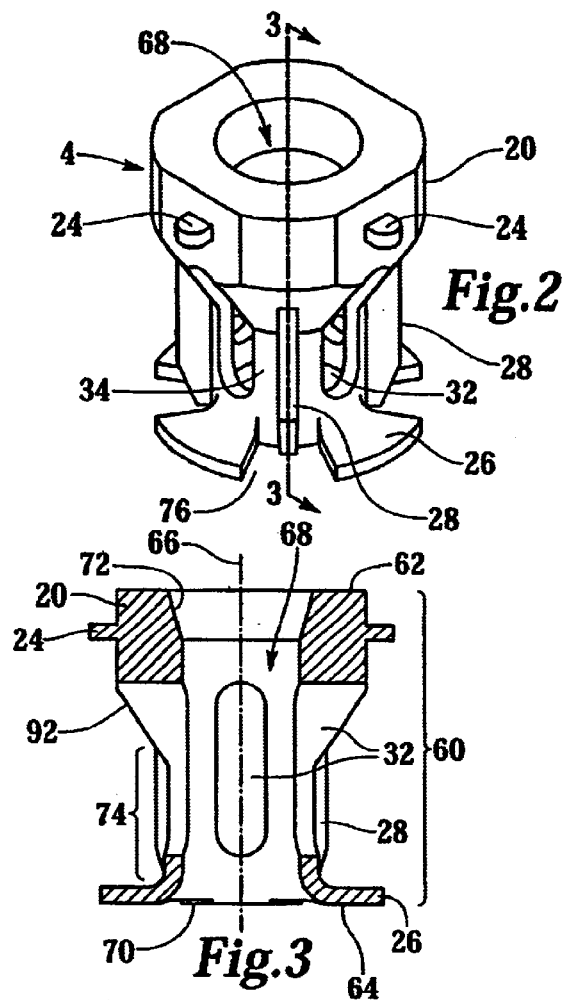
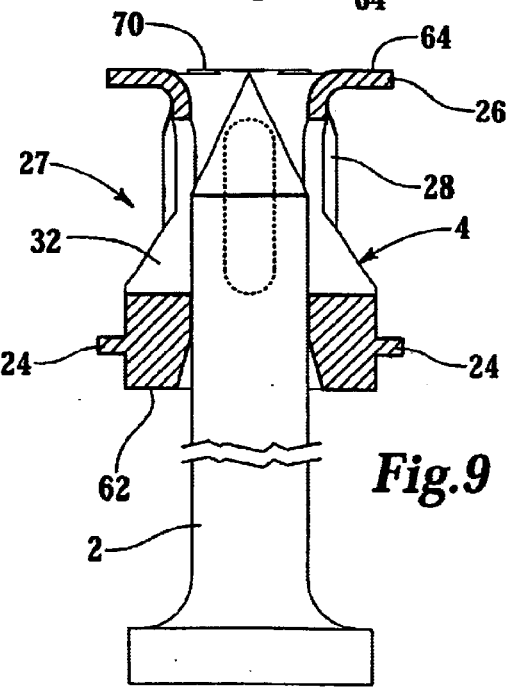

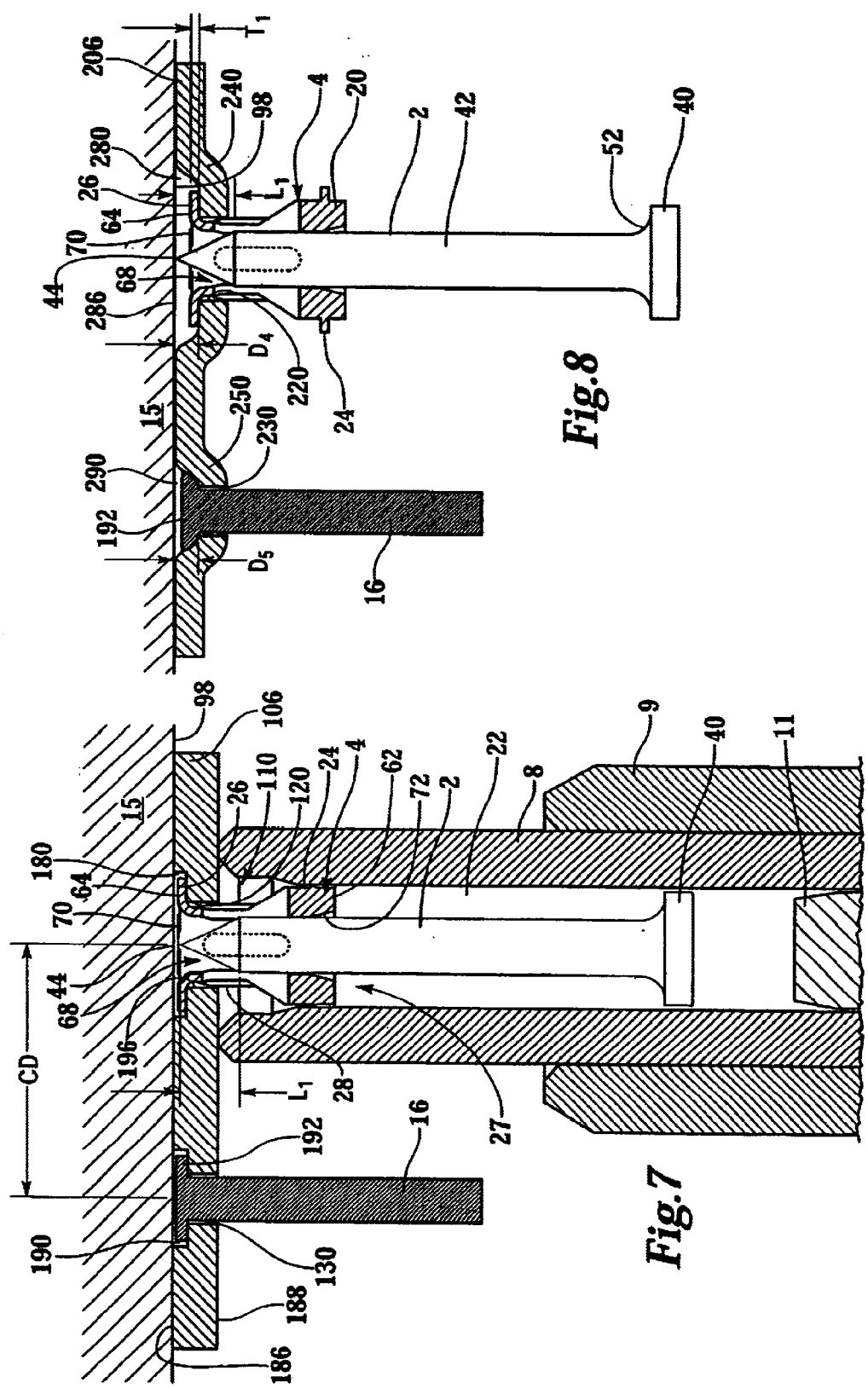

CEILING CLIP

BACKGROUND OF THE INVENTION

1. Field of Invention

The present invention relates to a fastener assembly used to secure a member, such as a ceiling clip, to a substrate, such as a ceiling. The clip can be employed to secure a wire that can be used to hang objects such as cables or suspended ceilings.

2. Description of Related Art

A fastener assembly for securing a wire to a substrate has generally comprised a fastener, such as a pin, that is driven into a substrate and a member, such as a clip, to be fastened to the substrate. Power actuated tools have been used to expedite the driving of the pin, by firing it, for example, using gunpowder. It is better to mount the pin in a hole in the member before driving so that the pin is guided through the hole into the substrate without the need for the operator to adjust the parts manually during firing. Mounting typically has been done by frictionally retaining the pin directly in the hole of the member.

Problems have arisen due to the aforementioned method. When mounted directly in the hole, the pin can skew and be introduced into the substrate at an angle, which should be avoided. When the pin is introduced at an angle, the contact between the pin head and the surface of the member around the hole is not well distributed and the member may not be properly fastened to the substrate, the member can be damaged, and the substrate can fissure.

Also when the member is flat in the region of the hole, the pin tip plays the role of a bearing point, wherein a pressure is generated between the pin tip and the substrate surface prior to firing, further influencing the pin to skew. A previous attempt to solve this problem was proposed in U.S. Pat. No. 4,703,883 to Losada and U.S. Pat. No. 4,736,923 to Losada. In these patents, the clip has a large cavity formed for housing the pin tip, but with increased cost, complexity, and possibilities of deformation, especially if the pin is accidentally fired at an angle.

Additionally, it has been estimated that as many as about 20% or more of traditional installations fail. The failure is typically due to a deformed pin. It is desirable to salvage the member, which is generally the most expensive component, by simply replacing the deformed pin rather than an entire assembly.

Another problem has been the difficulty of mounting a simple pin in the muzzle of the tool. In prior art such as U.S. Pat. No. 3,921,495 to Braun, two washers were used to help mount the pin in the muzzle. A tubular body with multiple fingers is taught in U.S. Pat. No. 3,452,637 to O'Brien, but the pin still has to be mounted in a hole in the member. The problems of skewing and pressure on the pin tip have not been solved.

What is needed is an improved fastener assembly that will solve the problems of the prior art. The innovative fastener assembly should be easily loaded in the muzzle of the tool, should protect the pin tip from pressure generated between the fastener assembly and the substrate prior to driving, should keep the pin substantially perpendicular to the substrate surface during driving, and should allow replacing the pin in case it is deformed.

BRIEF SUMMARY OF THE INVENTION

In accordance with the present invention, a fastener subassembly comprises a flute having a body and a pin having a tip for being driven into a substrate. The body of the flute has a longitudinal axis, a muzzle loading end, a mounting end, and a hollow bore. The pin is mounted in the bore with its tip proximate the mounting end, such that the tip is protected from pressure between the fastener subassembly and the substrate prior to driving. The mounting end of the flute has wings that extend radially outwardly. The wings allow the subassembly to be mounted in a hole in any suitable member that needs to be attached to a substrate while holding the pin substantially perpendicular to the substrate during driving.

In another aspect of the invention, a fastener assembly comprises, in addition to the above described fastener subassembly, a member to be fastened to a substrate. Using the wings of the flute, the fastener subassembly is mounted in a hole in the member. The subassembly is removable and replaceable in case the pin is deformed, so that the member is salvaged.

In still another aspect of the invention, the flute further comprises, at its muzzle loading end, an annular portion and centering elements that extend radially outwardly from the annular portion. The annular portion and the centering elements facilitate loading and holding the assembly in the muzzle of the power actuated tool.

Additional aspects of the invention include tangs which assist in mounting the flute in the hole and longitudinal weakness regions or apertures that allow the flute to collapse and seat or break away when the pin is driven.

BRIEF DESCRIPTION OF THE SEVERAL VIEWS OF THE DRAWING

FIG. 2 is a perspective view of the flute shown in FIG. 1.

FIG. 3 is a sectional view of the flute of FIG. 2 taken along lines 3—3.

FIG. 4 is a bottom plan view of the flute.

FIG. 5 is a side view of the flute.

FIG. 6 is a top view of the flute.

FIG. 7 is another embodiment of the fastener assembly having a generally flat clip with a wire secured to it, and part of a power actuated tool.

FIG. 8 is still another embodiment of the fastener assembly having a generally flat clip which includes two shallow indentations.

FIG. 9 is a cross sectional view of the fastener subassembly including a pin and a flute.

DETAILED DESCRIPTION OF THE INVENTION

Figure 1:
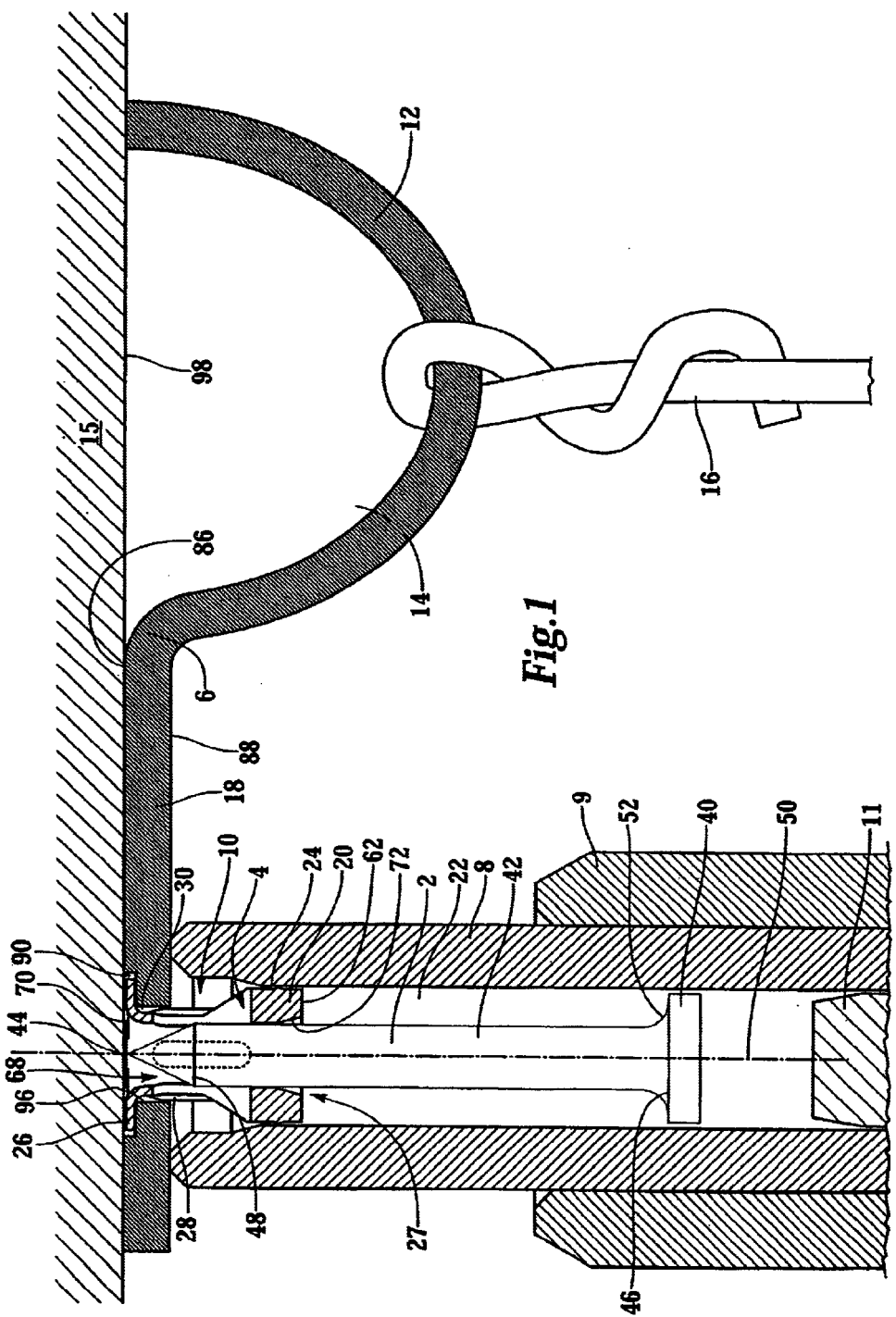
FIG. 1 is a cross sectional view of one embodiment of the inventive fastener assembly including a pin, a flute, a clip, and part of a power actuated tool.

Referring to FIG. 1, fastener assembly 10 comprises a pin 2, a flute 4 and a member or clip 6 to be fastened. In a preferred embodiment, member is a clip, but it may be a plate or such other apparatus as may be desired to be fastened to a substrate. Member should be of suitable size, weight, and material, as exemplified by typical ceiling clips and other similar accessories.

Fastener assembly 10 is inserted into muzzle 8 of a power actuated fastener driving tool 9, clip 6 is positioned against a substrate 15, and pin 2 is fired into substrate 15, so that clip 6 is affixed to substrate 15. Tool 9 comprises a piston 11 that will drive pin 2. Fastener assembly 10 may be designed for an acoustical ceiling application, wherein clip 6 further has a bent portion or an attachment part 12 with an aperture 14 for attaching a hanger or a wire 16.

Advantageously, clip 6 has a fastening part 18 that is a generally flat portion and comprises a fastener hole 30, such that it maintains pin 2 substantially normal to substrate surface 98 when tool 9 is pressed against substrate 15, so that pin 2 is not driven into substrate 15 at an angle.

Flute 4 includes the following features: an annular portion 20 cooperates with interior surface 22 of muzzle 8, so that the fastener assemblies are individually friction fit into muzzle 8 before firing; centering elements or protrusions 24 extend radially from annular portion 20 to center the fastener in muzzle 8 of tool 9 and guide the fastener through muzzle 8 of tool 9 during driving; wings 26 attach flute 4 to clip 6, in that way the same pin and flute subassembly 27 can be inserted to various clip configurations as long as the clip has a suitable hole; tangs 28 on flute 4 center flute 4 and pin 2 in hole 30 of clip 6; and longitudinal apertures 32 between side walls 34 of flute 4, seen in FIG. 2, allow flute 4 to collapse during firing. Returning to FIG. 1, flute 4 may break away from pin 2 or seat beneath pin head 40 after firing, depending on the energy of tool 9.

Flute 4 serves many purposes in conjunction with pin 2. First, flute 4 acts as a retention member to retain pin 2 in muzzle 8 of tool 9. Second, it acts as a guidance member for holding pin 2 concentric within muzzle 8 of tool 9, which is critical in forced-entry fastenings. Third, it has expandable wings 26 to allow for pin 2 to be inserted into a variety of steel clips to form an assembly. These clips are used for a multitude of applications by various contractors, including electricians and acoustical contractors. Fourth, flute 4 can act as a washer of bearing member to substrate 15 for fastenings where pin tip 44 is not flush to substrate 15.

Referring still to FIG. 1, innovative fastener assembly 10 includes pin 2, flute 4, and clip 6. Inventive assembly 10 is to be individually loaded in muzzle 8 of power actuated fastener driving tool 9. Flute 4 centers assembly 10 in muzzle 8 by cooperating with interior surface 22 of muzzle 8. Inventive flute 4 also allows the mounting of pin 2 in clip 6. In one embodiment, pin 2 is fired into substrate 15 using gunpowder. Flute 4 is designed to collapse or break away during firing of tool 9 such that the fastening is not disturbed by its presence. Pin 2 is mounted within flute 4 to form a replaceable subassembly 27. An advantage of subassembly 27 is that it is easily removable, such that pin 2 and flute 4 can be replaced in case pin 2 is damaged without having to replace clip 6.

Pin 2 has a head 40, a shank 42, and a tip 44. Shank 42 is generally cylindrical in shape and has a diameter that is significantly smaller than its length. Shank 42 has a trailing end 46 and a driving end 48. At trailing end 46, shank 42 is connected with head 40. Head 40 is also generally cylindrical in shape but has a diameter that is significantly larger than its length and than the diameter of shank 42. Head 40 and shank 42 are connected together such that the two cylinders have same axis 50. The connection between them can be a pin neck 52 that tapers towards shank 42. At driving end 48 of shank 42 is tip 44. Tip 44 is generally conical in shape. Fastener assembly 10 mounts pin 2 in muzzle 8 of tool 9 so that pin 2 and muzzle 8 have same axis 50. When tool 9 is fired, piston 11 is pushed towards pin 2. Piston 11 engages pin head 40 and drives pin 2 into substrate 15.

Referring to FIGS. 1 and 3, flute 4 has a body 60, a muzzle loading end 62, and a mounting end 64. Flute body 60 has a longitudinal axis 66. Flute body 60 has a hollow bore 68 extending the length of body 60 along longitudinal axis 66 between muzzle loading end 62 and mounting end 64. Hollow bore 68 has a boundary 70 proximate mounting end 64. Pin 2 is mounted in hollow bore 68 of body 60, with its tip 44 proximate boundary 70. In one embodiment shown in FIG. 1, pin tip 44 is substantially flush to boundary 70 or slightly recessed with respect to boundary 70 such that tip 44 is completely inside bore 68. Tip 44 is thus protected from the pressure that can be generated during contact with substrate 15 prior to firing. Mounted in longitudinal bore 68 of flute 4, pin 2 can be fired in substrate 15 without skewing. Preferably, hollow bore 68 has a flared portion 72 at muzzle loading end 62 such that it is easier to introduce pin tip 44 into flute 4. Flute body 60 has a generally cylindrical trunk 74.

In another embodiment shown in FIG. 8, pin tip 44 goes slightly outside hollow bore 68, but such that pin tip 44 is still proximate boundary 70. As discussed below, tip 44 is still protected from pressure prior to driving.

Referring to FIG. 3, flute 4 has wings 26 at its mounting end 64. Wings 26 extend outwardly radially from flute body 60. In a preferred embodiment shown in FIG. 4, each wing 26 is a flat angular section, i.e. is the intersection between an angle and two concentric circles. Flat wing 26 is generally perpendicular to flute longitudinal axis 66, as shown in FIG. 5, but can bend as described below. Wings 26 may be three or four in number, preferably four. Wings 26 generally have the same size and are generally equiangularly spaced around mounting end 64, as shown in FIG. 4. Wings 26 are separated by slots 76 that are generally trapezoidal in shape and can also be angular sections. Distal-end 78 of a wing 26 is larger than distance $D_1$ separating the distal-ends of two consecutive wings 26, so that wings 26 are wider than slots 76 at distal end. In the contrary, proximal-end 82 of a wing 26 is smaller than distance $D_2$ separating the proximal-ends of two consecutive wings 26, so that wings 26 are narrower than slots 76 at proximal-end.

Innovative flute 4 allows for multiple types of clips because with its wings 26, flute 4 can be inserted into a variety of clips provided the clip has a suitable hole. Therefore the present invention can be used in a multitude of applications by various contractors, including electricians and acoustical contractors. In one embodiment shown in FIG. 1, clip 6 has a fastening part 18 and an attachment part or a hook 12. Fastening part 18 is the part that will be fastened to substrate 15 using pin 2. Attachment part 12 is the part to which wire 16 is attached. Fastening part 18 has a substrate side 86 and an outer side 88, with a hole 30 extending through it from outer side 88 to substrate side 86. Flute 4 is mounted on clip 6 through hole 30, such that wings 26 spread radially outwardly on substrate side 86. Wings 26 can bend to allow for insertion through hole 30, but only under a predetermined force. They can bend such that flute 4 can be removed by a predetermined force and another flute mounted in clip 6 in case pin 2 is deformed, so that clip 6 can be salvaged. A predetermined force is needed to bend wings 26 such that flute 4 remains mounted in clip 6 during packing and shipping. In a preferred embodiment, clip 6 has a recess 90 in its substrate side 86 around hole 30 so that wings 26 fit in recess 90 and spread radially outwardly in recess 90. When pressed against substrate 15, substrate side 86 of clip 6 is substantially flush against substrate 15 and receives the corresponding pressure, not wings 26. Recess 90 also makes assembly 10 stronger by protecting wings 26. Recess 90 is formed by a counter-bore in substrate side 86 of clip 6 around hole 30. In another embodiment, recess can be formed by a shallow indentation 240 as in FIG. 8.

Flute 4 is preferably made of plastic and its body 60 comprises generally longitudinal weakness regions or apertures 32, see FIG. 2. In a preferred embodiment, the generally longitudinal weakness regions are longitudinal apertures. Alternatively, the generally longitudinal weakness regions can be longitudinal grooves or creases. In still another embodiment, generally longitudinal weakness regions can be longitudinal recesses in the flute body. They also can be longitudinal lines of perforations. Apertures, grooves, creases, recesses or perforations contribute to the collapsing or breaking of the flute upon application of a predetermined energy.

Plastic composition of flute 4 together with longitudinal apertures 32 allow flute 4 to collapse easily under pin head 40 during driving of pin 2. Flute 4 may break away from pin 2 or seat beneath pin head 40 depending on the energy of tool 9. Longitudinal apertures 32 must be large enough to contribute to the collapsing, but not excessively large, such that the structure of flute 4 is strong enough to maintain integrity during manufacturing, packaging, shipping, and handling prior to firing. In one embodiment shown in FIGS. 2 and 3, the width of an aperture 32 is about one fourth to about half, and preferably about one third, of the diameter of trunk 74 of flute body 60. Its length is about one third to about two thirds, and preferably about half, of the length of flute 4 from muzzle loading end 62 to mounting end 64. Apertures 32 are separated by side walls 34 of flute body 60. There is a plurality of apertures 32, preferably about four, that are preferably generally equally spaced around the circumference of flute body 60, such that flute 4 collapses evenly. If apertures 32 are not evenly distributed around body 60, especially if the energy of tool 9 is such that flute 4 does not break, flute 4 might seat unevenly beneath pin head 40 causing pin 2 to skew.

The plastic composition of flute 4 is selected to be strong enough such that flute 4 will not break when stored or shipped to the customer, yet ductile enough to collapse under the pressure of pin head 40 when pin 2 is driven by piston 11 of tool 9, see FIG. 1. During driving, pin head 40 engages flute 4 on its muzzle loading end 62. If the energy of tool 9 is lower than a certain threshold or predetermined amount of energy, side walls 34 will bow and flute 4 will seat beneath pin head 40. If the energy of tool 9 is higher than the threshold, flute 4 will break away from pin 2. The breaking will occur at any weak point in the flute structure.

As shown in FIG. 1, an annular portion 20 on muzzle loading end 62 cooperates with interior surface 22 of muzzle 8 such that fastener assembly 10 form a friction fit inside muzzle 8. Therefore flute 4 acts as a retention member to retain fastener assembly 10 in muzzle 8. In a preferred embodiment shown in FIG. 3, annular portion 20 ends with a tapered neck 92 that tapers inwardly from annular portion 20 to trunk 74. Annular portion 20 has a diameter that is substantially larger than the diameter of trunk 74 of flute 4. Returning to FIG. 1, if the energy of power actuated tool 9 is such that flute 4 seats beneath pin head 40 after firing, annular portion 20 can play the role of a washer between pin head 40 and outer side 88 of clip 6.

Preferably, annular portion 20 includes centering elements 24 that extend radially outwardly from annular portion 20, as shown in FIGS. 2 and 3. Centering elements 24 are located at a predetermined distance from muzzle loading end 62. Returning to FIG. 1, centering elements 24 contact interior surface 22 of muzzle 8 and center fastener assembly 10 in muzzle 8 to guide it during driving. Thus flute 4 acts as a guidance member for holding pin 2 concentric within muzzle 8 during firing, which is critical in forced entry fastenings. There are preferably three or four such centering elements 24. In one embodiment, centering elements 24 are tongue-shaped protrusions having semi-circular portions 94 and are evenly distributed around annular portion 20, as seen in FIG. 6. When flute 4 is mounted into muzzle 8, centering elements 24 contact the interior surface 22 of muzzle 8 as seen in FIG. 1 to guide fastener assembly 10 during firing. A smaller number of centering elements 24 or a concentrated distribution in only one side of annular portion 20 will not effectively center fastener assembly 10 in muzzle 8. Both the width and the thickness of centering elements 24 are significantly smaller than respectively the diameter and the thickness of annular portion 20, as shown in FIGS. 3 and 6. The small thickness of centering elements 24 allows them to be flexible. Apparent diameter $D_3$ of annular portion 20 including centering elements 24 is generally slightly larger than the interior diameter of muzzle 8. Thus, when flute 4 is introduced in muzzle 8, centering elements 24 bend and are compressed against interior surface 22 of muzzle 8, as in FIG. 1, participating in the retention and guidance tasks of flute 4.

As shown in FIGS. 1, 2, 3, 4, and 5, flute body 60 may further comprise tangs 28 proximate wings 26. As seen in FIG. 1, tangs 28 cooperate with and are compressed by interior surface 96 exposed by hole 30 to keep flute longitudinal axis 66 (seen in FIG. 3), and consequently pin 2, substantially centered in hole 30 and substantially perpendicular to substrate surface 98. There should be at least three tangs 28, preferably equiangularly spaced, such that the stress is evenly distributed. A preferred embodiment has four tangs as shown in FIG. 4. Tang width may vary, but in a preferred embodiment is between about one eighth and about one tenth, preferably about one ninth, of the diameter of trunk 74 around which they are distributed.

Returning to FIG. 1, flute 4 houses pin tip 44 in its bore 68 protecting pin tip 44 from pressure before driving, and thus allows a clip 6 having a flat fastening part 18. Such a clip 6 is easy to manufacture since forming fastening part 18 consists only in drilling or punching a hole 30 and forming a recess 90 around it. Combined with the invention described in the patent application Ser. No. 10/361,219 entitled "Ceiling Clip and Method of Assembly" filed contemporaneously herewith, the disclosure of which is incorporated herein by reference, flute 4 allows the use of a generally flat clip 106, such as seen in FIG. 7, which is easy and inexpensive to manufacture and which reduces center distance CD between pin 2 and the wire location and thus reduces the stress generated on clip 106.

Still referring to FIG. 7, the process of securing a wire 16 to a ceiling or substrate 15, starting from the manufacturing to the final step, is described below. Two holes, a fastener hole 120 and a wire hole 130, are drilled or punched in a metallic plate. Other types of plate can be used, such as a molded plastic plate with holes, but a metallic plate is preferred. A recess is preferably formed on metallic plate around each of the holes 120 and 130, such that both recesses 180 and 190 are on the same side, substrate side 186. Recesses 180 and 190 may be machined on substrate side 186 of metallic plate, such as counter-bored. Metallic plate is now a generally flat clip 106 shown in FIG. 7. In another embodiment shown in FIG. 8 and discussed below, recesses can be created by bending metal slightly.

Returning to FIG. 7, a flute 4 having the aforementioned properties is molded in plastic, such as by injection molding. A pin 2 is inserted into hollow bore 68 of flute 4 to form a fastener subassembly 27 of flute 4 and pin 2. Pin tip 44 is introduced from flared portion 72 of hollow bore 68 until it is proximate mounting end 64 of flute 4 but such that pin tip 44 is still in bore 68, so that tip 44 will not touch substrate 15 prior to the firing. Flute 4 is mounted in fastener hole 120 by being pushed through fastener hole 120 from outer side 188 with its wings 26 towards clip 106. Wings 26 bend backward allowing flute 4 to be inserted. Once completely on substrate side 186, wings 26 open up again. Flute 4 is pulled backward slightly, allowing wings 26 to spread out and settle into flute recess 180 and tangs 28 to be in contact with interior surface 196 of clip 106 exposed by fastener hole 120, so that tangs 28 center pin 2 in fastener hole 120 and keep pin 2 substantially perpendicular to substrate surface 98.

Still referring to FIG. 7, wire 16 is introduced in wire hole 130. A head 192 is formed along wire 16 on substrate side 186 and wire 16 is cut so that head 192 settles into corresponding wire head recess 190, as described in patent application Ser. No. 10/361,219 such that wire 16 is secured to clip 106. Assembly 110 is loaded in muzzle 8 of a gunpowder activated tool 9 such that generally flat clip 106 is substantially perpendicular to muzzle 8.

Substrate side 186 is pressed against substrate 15 to which wire 16 must be secured, such that muzzle 8 is substantially perpendicular to substrate surface 98. Pin 2 is driven in substrate 15. Flute 4 collapses under the energy transmitted to pin 2 by tool 9 and it breaks away or seats beneath pin head 40. The securing of wire 16 is accomplished.

In another embodiment shown in FIG. 8, a generally flat clip 206 is used. Clip 206 is formed by a substantially flat plate in which a fastener hole 220 and a wire hole 230 are drilled or punched. A shallow indentation is formed around each of the holes, a flute indentation 240 and a wire indentation 250, such that a flute recess 280 and a wire head recess 290 are formed respectively around fastener hole 220 and wire hole 230. Indentations 240 and 250 are formed by slightly bending the substantially flat plate of clip 206 around holes 220 and 230. When flute 4 is mounted in fastener hole 220, wings 26 expand in flute recess 280. When wire 16 is headed and secured to clip 206, head 192 settles into corresponding wire head recess 290, as described in patent application Ser. No. 10/361,219.

Referring still to FIG. 8, depth $D_4$ of flute recess 280 is preferably sufficient to accommodate thickness $T_1$ of wings 26, still more preferably slightly greater than thickness $T_1$ to allow a slight tolerance. Depth $D_4$ may be about one to about five times thickness $T_1$, in one embodiment about three times, see FIG. 8. Preferably depth $D_4$ is smaller than or substantially equal to length $L_1$ of pin tip 44. In one embodiment shown in FIG. 8, length $L_1$ is about three times depth $D_4$. Depth $D_5$ of wire head recess 290 is preferably such that head 192 fits in wire head recess 290. Pin 2 is mounted in flute 4 such that pin tip 44 is proximate flute mounting end 64. Due to flute indentation 240, pin tip 44 can go slightly outside hollow bore 68, but such that pin tip 44 is still flush to or slightly recessed with respect to substrate surface 98 when clip 206 is pressed against substrate 15, so that pin tip 44 is protected from pressure before driving. It may be advantageous to position pin tip 44 flush against substrate 15, but without applying substantial pressure therebetween, in that, upon firing, travel or free flight of pin 2 is eliminated, thereby reducing risk of unintended trajectory.

Returning to FIG. 1, in the described invention, one piece, namely flute 4, is accomplishing a multitude of tasks. Flute 4 protects pin tip 44, such that pressure generated between substrate 15 and fastener assembly 10 prior to driving is applied on substrate side 86 of clip 6 rather than on pin tip 44.

Flute 4 keeps pin 2 substantially perpendicular to substrate surface 98 and to substrate side 86 of clip 6 such that it is not driven at an angle. This is due to the cooperation between wings 26, tangs 28, and hollow bore 68 of flute 4, as described below. Wings 26 allow for flute 4 to be inserted into a variety of clips or other accessories having a hole. Tangs 28 keep flute longitudinal axis 66 (seen in FIG. 3) substantially perpendicular to substrate side 86 of clip 6 and therefore to substrate surface 98 once clip 6 is pressed against substrate 15 just before driving pin 2. Hollow bore 68 of flute 4 keeps pin 2, which is inserted in bore 68, substantially parallel to flute longitudinal axis 66 and thus substantially perpendicular to substrate 15 at the moment of driving.

Continuing with FIG. 1, with its annular portion 20 and centering elements 24, flute 4 acts as a retention component to retain pin 2 in muzzle 8 of tool 9. It also acts as a guide for holding pin 2 concentric within muzzle 8 of tool 9 so that pin 2 is coaxial with muzzle 8, which is critical in power driven fastenings.

With its flexible wings 26, flute 4 is removable and replaceable. In case of a failed installation of pin 2, subassembly 27 of flute 4 and pin 2 can be removed and replaced such that clip 6, which is usually the most expensive component, can be salvaged.

Due to its plastic composition and to longitudinal apertures 32, flute 4 can be made to collapse under pin head 40, depending on the energy of tool 9. If flute 4 seats beneath pin head 40, flute 4 acts as a washer distributing pressure between pin head 40 and outer side 88 of clip 6. Also if energy of tool 9 is not enough to drive pin 2 until pin head 40 is flush to outer side 88 of clip 6, flute 4 acting as a washer eliminates a gap which might otherwise occur between pin head 40 and clip 6. Such a gap would have weakened the fastening of clip 6 to substrate 15.

While the invention has been described with respect to a preferred embodiment, it should be appreciated by those skilled in the art that variations and modifications may be made without departing from the spirit or scope of the invention. Therefore, the present invention should not be limited to the above described embodiment, but should be limited solely by the following claims.

What is claimed is:

1. A fastener subassembly for being driven by a power actuated tool having a muzzle, comprising:

a flute having a body with a longitudinal axis;

a pin having a tip for being driven into a substrate;

said body of said flute having a muzzle loading end, a mounting end, and a hollow bore extending along said longitudinal axis;

said flute having centering elements extending radially outwardly from said flute body for centering said pin within said muzzle;

said pin being mounted in said bore with said pin tip proximate said mounting end;

said mounting end of said flute body having wings extending radially outwardly.

2. A fastener subassembly according to claim 1, wherein said body of said flute further comprises tangs proximate said wings.

3. A fastener subassembly according to claim 1, wherein said muzzle loading end of said body of said flute comprises an annular portion and wherein said centering elements extend radially outwardly from said annular portion.

4. A fastener subassembly according to claim 1, wherein there are four wings.

5. A fastener subassembly for being driven by a power actuated tool, comprising:

a flute having a body with a longitudinal axis;

a pin having a tip for being driven into a substrate;

said body of said flute having a muzzle loading end, a mounting end, generally longitudinal weakness regions, and a hollow bore extending along said longitudinal axis;

said pin being mounted in said bore with said pin tip proximate said mounting end;

said mounting end of said flute body having wings extending radially outwardly.

6. A fastener subassembly according to claim 5, wherein said generally longitudinal weakness regions comprise longitudinal apertures.

7. A fastener subassembly according to claim 6, wherein there are four longitudinal apertures.

8. A fastener assembly according to claim 6, wherein said body of said flute has a trunk;

said trunk has a diameter;

said longitudinal apertures have a width that is about one third of said diameter of said trunk;

said flute has a length from said muzzle loading end to said mounting end;

said longitudinal apertures have a length that is about half of said length of said flute.

9. A fastener assembly for being driven by a power actuated tool having a muzzle, comprising:
   a flute having a body with a longitudinal axis;
   a pin having a tip for being driven into a substrate;
   a member to be fastened to said substrate;
   said member having a substrate side and an outer side, with a hole extending through said member from said outer side to said substrate side;
   said body of said flute having a muzzle loading end, a mounting end, and a hollow bore extending along said longitudinal axis;
   said flute having centering elements extending radially outwardly from said flute body for centering said pin within said muzzle;
   said mounting end of said flute having wings;
   said pin being mounted in said bore with said pin tip proximate said mounting end;
   said flute being mounted in said hole of said member so that said wings spread radially outwardly on said substrate side of said member.

10. A fastener assembly according to claim 9, wherein said body of said flute further comprises tangs proximate said wings.

11. A fastener assembly according to claim 9, wherein said muzzle loading end of said body of said flute comprises an annular portion and centering elements that extend radially outwardly from said annular portion.

12. A fastener assembly according to claim 9, wherein said flute is removable from said member.

13. A fastener assembly according to claim 9, wherein said member has a recess in said substrate side around said hole.

14. A fastener assembly according to claim 9, wherein said member is a clip;
   said clip having a fastening part;
   wherein said fastening part is generally flat;
   and wherein said hole is in said fastening part.

15. A fastener assembly according to claim 9, wherein said member is a generally flat clip.

16. A fastener assembly according to claim 9, wherein said wings are four.

17. A fastener assembly for being driven by a power actuated tool, comprising:
   a flute having a body with a longitudinal axis;
   a pin having a tip for being driven into a substrate;
   a member to be fastened to said substrate;
   said member having a substrate side and an outer side, with a hole extending through said member from said outer side to said substrate side;
   said body of said flute having a muzzle loading end, a mounting end, generally longitudinal weakness regions and a hollow bore extending along said longitudinal axis;
   said mounting end of said flute having wings;
   said pin being mounted in said bore with said pin tip proximate said mounting end;
   said flute being mounted in said hole of said member so that said wings spread radially outwardly on said substrate side of said member.

18. A fastener assembly according to claim 17, wherein said generally longitudinal weakness regions comprise longitudinal apertures.

19. A fastener assembly according to claim 18, wherein said longitudinal apertures are four.

20. A fastener assembly according to claim 18, wherein said body of said flute has a trunk;
   said trunk has a diameter;
   said longitudinal apertures have a width that is about one third of said diameter of said trunk;
   said flute has a length from said muzzle loading end to said mounting end;
   said longitudinal apertures have a length that is about half of said length of said flute.

21. A fastener assembly for being driven by a power actuated tool, comprising:
   a flute having a body with a longitudinal axis;
   a pin having a tip for being driven into a substrate;
   a generally flat clip to be fastened to said substrate;
   said clip having a substrate side and an outer side, with a hole extending through said clip from said outer side to said substrate side;
   said clip having a recess in said substrate side around said hole;
   said body of said flute having a muzzle loading end, a mounting end, and a hollow bore extending along said longitudinal axis;
   said mounting end of said flute having wings;
   said pin being mounted in said bore with said pin tip proximate said mounting end;
   said flute being mounted in said hole of said clip so that said wings spread radially outwardly in said recess on said substrate side of said clip;
   said body of said flute having longitudinal apertures;
   said body of said flute further comprising tangs proximate said wings;
   said muzzle loading end of said body of said flute comprising an annular portion and centering elements that extend radially outwardly from said annular portion;
   said flute being removable from said clip.

* * * * *